United States Patent [19]

Eisert

[11] 4,141,609
[45] Feb. 27, 1979

[54] SYSTEM FOR EFFECTING ACCESS INTO SEALED ENCLOSURES

[75] Inventor: Gerald A. Eisert, Hastings, Minn.

[73] Assignee: Central Research Laboratories, Inc., Red Wing, Minn.

[21] Appl. No.: 854,884

[22] Filed: Nov. 25, 1977

[51] Int. Cl.² .................................... A61G 11/00
[52] U.S. Cl. ........................ 312/1; 128/1 B; 52/398; 49/488
[58] Field of Search ............. 312/1; 49/488; 128/1 B; 52/398, 400

[56] References Cited

U.S. PATENT DOCUMENTS

| | | | |
|---|---|---|---|
| 2,600,240 | 6/1952 | Grieb | 128/1 B |
| 2,695,605 | 11/1954 | Gibbon | 128/1 B |
| 3,084,684 | 4/1963 | Saunders | 128/1 B |
| 3,099,015 | 7/1963 | Renehan | 312/1 |
| 3,140,495 | 7/1964 | Gottwik | 312/1 |
| 3,267,614 | 8/1966 | Cazalis et al. | 49/488 |
| 4,010,588 | 3/1977 | Eisert | 52/398 |
| 4,069,913 | 1/1978 | Harrigan | 312/1 |

Primary Examiner—Victor N. Sakran
Attorney, Agent, or Firm—Burd, Braddock & Bartz

[57] ABSTRACT

An improved system for effecting working access into sealed enclosures, such as glove boxes. The system includes an elongated arm-length sleeve, one end of which is sealed in a port fitting in the wall of the chamber and the other end of which is fitted with a replaceable glove. The elongated sleeve is preferably tapered from shoulder to wrist and of corrugated or convoluted structure for easy extension and retraction. The porthole fitting is preferably elliptical to maximize working access to the chamber. The inner end of the sleeve is fitted with a wrist bushing in which a glove supported on a deformable ring may be fit in sealed relation. The glove may be replaced with a further glove supported on a separate deformable ring without disruption of the sealed relationship.

9 Claims, 6 Drawing Figures

SYSTEM FOR EFFECTING ACCESS INTO SEALED ENCLOSURES

BACKGROUND OF THE INVENTION

1. Field of the Invention

This invention is directed to an improved system for providing working access to a sealed enclosure such as a glove box. Glove boxes are generally leak-proof rigid-walled chambers, generally transparent so as to permit the interior to be viewed from the outside, and provided with a plurality of ports in each of which a glove is secured such that a technician may insert his hands through the ports into the gloves and perform manipulative operations within the enclosed chamber. The interior of the chamber is sealed off from the surrounding environment either to protect the operator and the outside environment from contamination by hazardous materials within the chamber, or to protect materials within the chamber from contamination by exposure to atmospheric air.

This type of chamber may be used for the handling of various noxious or hazardous materials, radioactive objects, and the like. Leak-tightness is essential. While this may be achieved relatively easily in a one-time installation, it is extremely difficult to replace parts such as to replace a glove, without loss of integrity of the seal of the chamber environment. In existing glove boxes the range of maneuverability of the operator is limited by the size and shape of the port opening through which the hand and arm extend and by the length of the glove. Gloves with long heavy sleeve portions tend to be difficult to extend and retract. Wear and damage most frequently occur to the hand enclosing portion of the glove but it is necessary that the entire glove, which is relatively expensive, be replaced.

2. The Prior Art

Applicant's prior U.S. Pat. No. 4,010,588 discloses a system by means of which one glove in sealing engagement with a port in a glove box can be replaced with another while preserving the integrity of the seal separating the environments on the opposite sides of the chamber wall while the exchange is taking place. This system performs admirably for its intended purpose but is limited to the replacement of an entire glove with long integral sleeve portion which is sealed in the port into the chamber.

Grieb U.S. Pat. No. 2,600,240, and Gibbon U.S. Pat. No. 2,598,532 both show infant incubators with ports in which long lightweight flexible plastic sleeves may be sealed. The sleeves are shown formed with corrugations or convolutions. However, because absolute integrity of the interior environment is not essential, the sleeves do not carry gloves but merely are provided with open elastic cuffs through which the hand is extended with the elastic cuff engaging the wrist in partial sealing engagement.

SUMMARY OF THE INVENTION

The system of the present invention is designed to alleviate the shortcomings of the prior art. Accordingly, the present invention is an improved system for effecting access for performing work within a sealed enclosure. The system comprises an elongated arm-length impermeable leak-proof flexible sleeve. Preferably the sleeve is formed from relatively heavy synthetic resinous plastic material tapered from shoulder to wrist and formed with corrugations or convolutions to facilitate extension and retraction. The port in one wall of the enclosure is provided with an annular flanged fitting secured in sealing relation to the wall. The port and fitting are desirably elliptical in shape with the long axis extending horizontally. The fitting includes an outwardly extending annular lip having at least one continuous groove extending around its outer periphery. The shoulder end of the sleeve extends through that fitting and is folded back against the outer periphery of the lip with sealing engagement in the peripheral groove by means of a resilient fastening ring, and secured with a metallic band.

A wrist bushing is secured in sealing relation to the opposite end of the sleeve. The bushing comprises a ring having an outer peripheral groove. The wrist end of the sleeve extends over the outside of the bushing and is rigidly clamped in sealing relation in the groove. The bushing also has a continuous sealing surface extending around its inner periphery and a continuous groove adjacent to that sealing surface. An annular support ring is detachably secured in the wrist bushing. The support ring has an outer peripheral deformable semi-rigid bead which engages the inner peripheral groove of the bushing and a continuous channel spaced from the bead and extending around the outer periphery of the support ring. A flexible glove is secured in sealing relation on the support ring. The cuff of the glove engages the outer periphery of the support ring overlying the channel and a resilient fastening ring secures the glove in sealing engagement in the channel. The outer periphery of that resilient ring then engages the sealing surface of the bushing to maintain a tight sealed relationship. When it is necessary that the glove be replaced for any reason, this is readily done by mounting a new glove on a separate support ring in the same manner, pushing the old glove through the bushing by exerting force with the new support ring while maintaining the seal in the bushing.

BRIEF DESCRIPTION OF THE DRAWINGS

The invention is illustrated in the accompanying drawings in which corresponding parts are identified by the same numerals and in which.

DESCRIPTION OF THE PREFERRED EMBODIMENT

Figure 1:
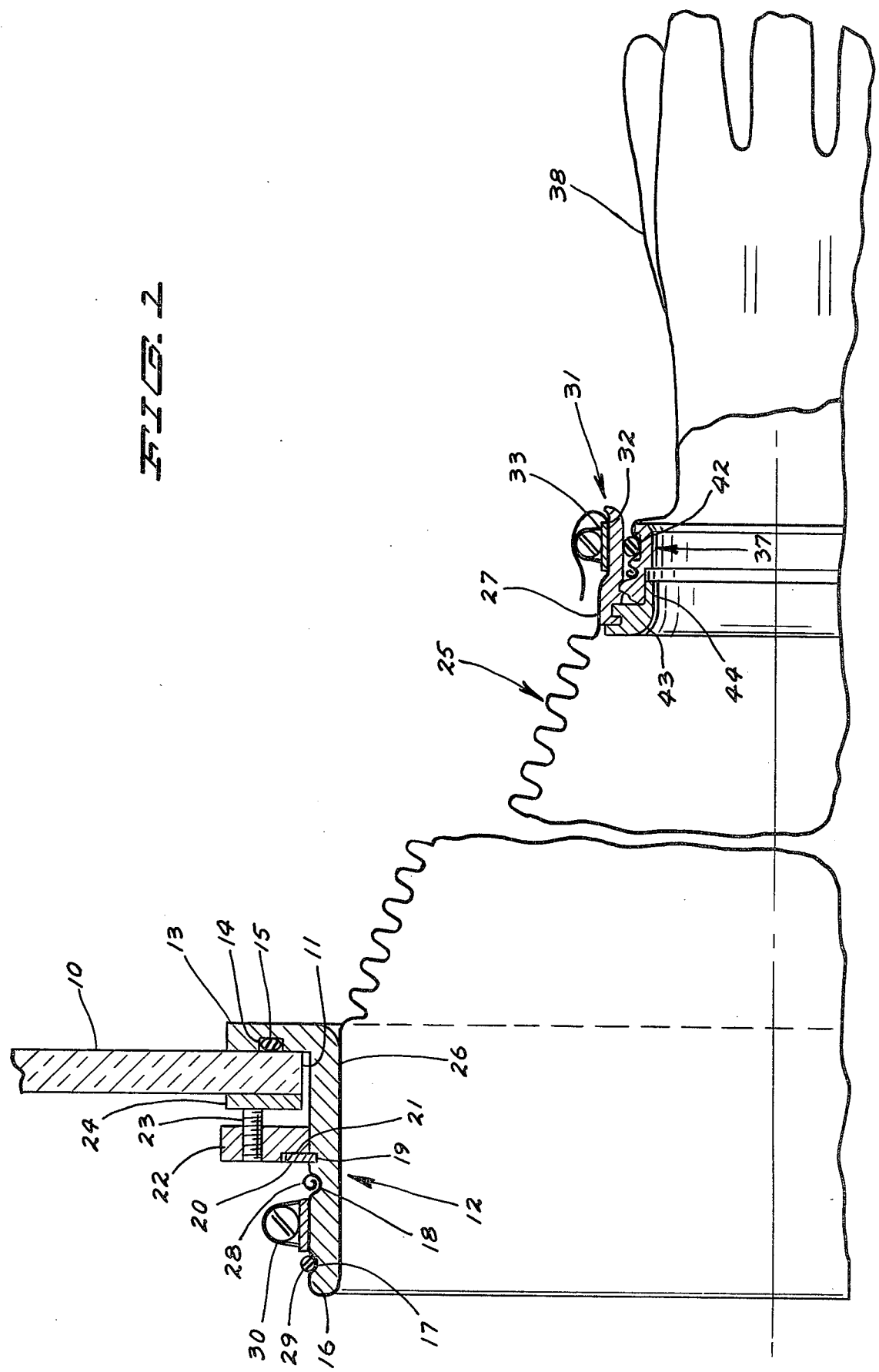
FIG. 1 is a partial schematic representation, in section, of the overall system of the invention.
Figure 2:
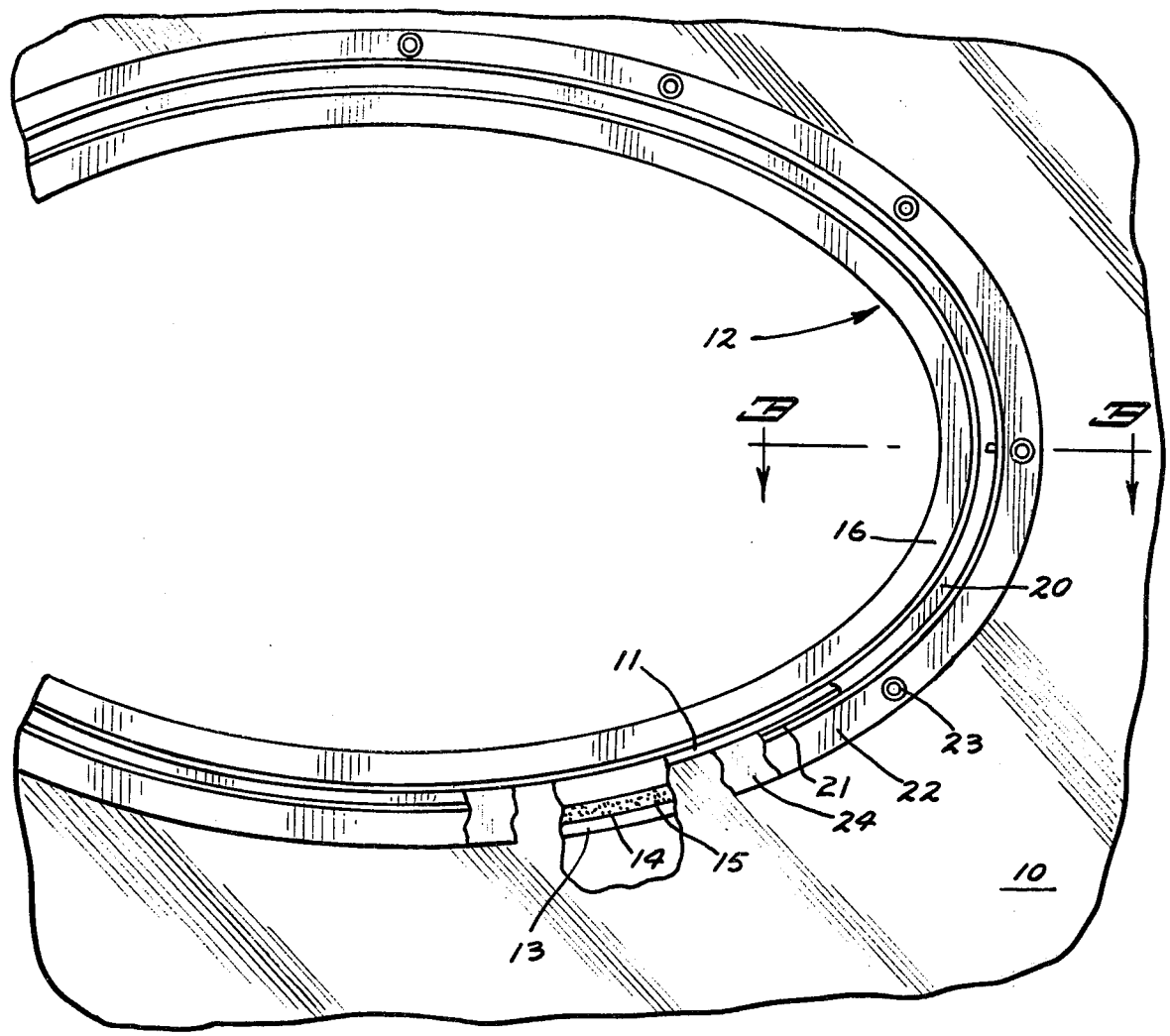
FIG. 2 is an elevation of a segment of wall of an enclosure having a porthole with an annular fitting secured therein.
Figure 3:
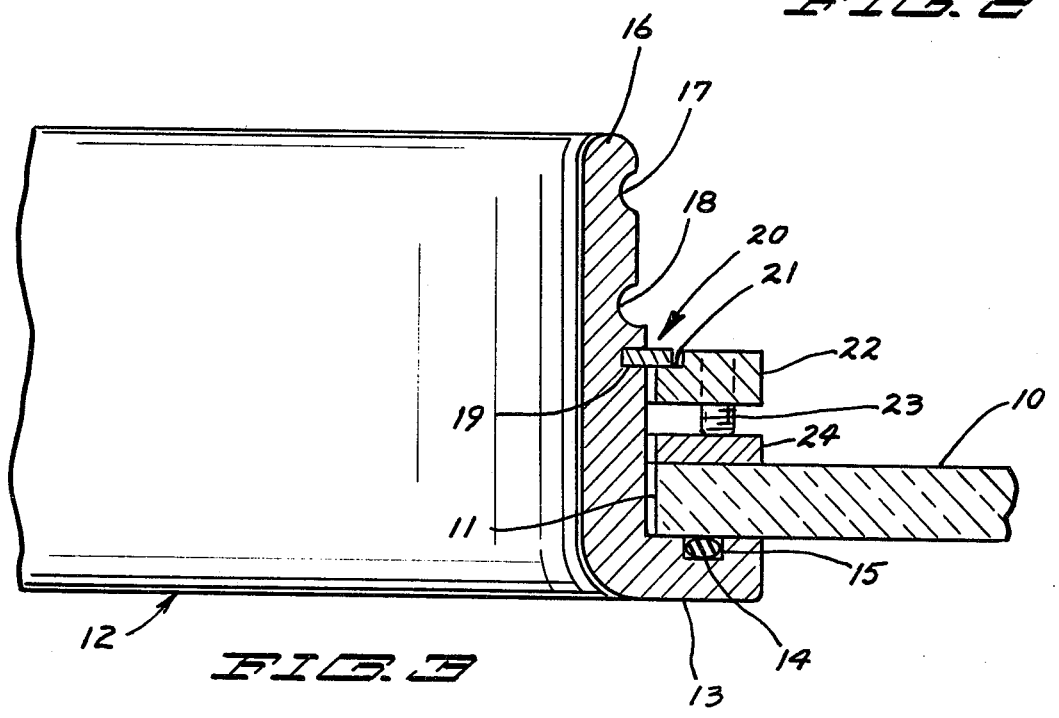
FIG. 3 is a horizontal section on the line 3—3 of FIG. 2.

The improved system for effecting access for performing work within a sealed enclosure, such as a glove box, is shown schematically in FIG. 1. A rigid wall 10 forms part of a chamber desired to be maintained in leak-proof condition such that its environment is separate from the surrounding outside environment. Wall 10 includes an opening or port 11 in which is positioned an annular fitting in the form of a ring, indicated generally at 12. Ring 12 is of dimension slightly less than that of opening or port 11 such that it will fit easily therein and has a radially projecting rearward flange 13. One surface of flange 13 is provided with an annular groove or channel 14 in which is seated a resilient O-ring 15 of rubber or synthetic elastomeric material.

Ring 12, formed from stainless steel or similar rigid durable material, is inserted through wall 10 from the inside (or right side, as viewed in FIG. 1) prior to final assembly of the chamber. Ring 12 includes an integral outwardly and axially extending annular lip 16 having a spaced apart pair of peripheral grooves 17 and 18. A narrow channel 19 is formed in lip 16 spaced inwardly from grooves 17 and 18. Channel 19 is adapted to receive lock ring segments 20. Lock ring segments 20 engage a shoulder 21 on fastening ring 22. Ring 22 has a plurality of set screws spaced apart around its periphery. The ends of screws 23 engage a further ring 24 which in turn is in face-to-face abutment with the exterior surface of wall 10.

As screws 23 are tightened, shoulder 21 of ring 22 exerts outward force against lock ring segments 20, pulling flange 13 into tight engagement with the inner surface of wall 10 and compressing O-ring 15 into a leak-proof seal. Opening or port 11 and fitting 12 are preferably of elliptical shape with the long axis extending horizontally. The opening in fitting 12 is desirably of substantial size in order to permit insertion of the shoulder into the opening for maximum reach. In a typical installation, the opening in fitting 12 is about 9 × 15 inches (23 × 38 cm).

A sleeve, indicated generally at 25, has a cylindrical shoulder portion 26 and a cylindrical wrist portion 27. Sleeve 25 is elongated, generally conical, and preferably corrugated or convoluted between the cylindrical portions, as shown. The shoulder portion 26 of the sleeve extends through fitting 12 from the inside of the chamber and its end edge is folded over the outside edge of projecting lip 16. If the shoulder portion of the sleeve has a bead 28, then that bead lies in groove 18. An O-ring 29 is applied over the outside of the sleeve overlying groove 17 to form a tight seal between the sleeve and lip. For maximum security, a band or strap clamp 30 is applied over the sleeve portion on the outside of projecting lip 16 between grooves 17 and 18 and tightly fastened. A wide variety of suitable band clamps are commercially available with a variety of locking means including ratchet locks, screw locks of various types, worm drive locks, and the like.

The wrist portion 27 of sleeve 25 is fitted over the outside perimeter of a wrist bushing 31. Bushing 31 has an outside peripheral channel 32. A band clamp 33 overlying the wrist portion in groove 32 secures the wrist bushing to the sleeve in tight sealed relation. The free end of the cylindrical wrist portion 27 is then folded back over the clamp.

Sleeve 25 is formed from rubber or rubber-like synthetic resinous materials. It is preferably formed with relatively thick walls, compared with the glove, for maximum wear and durability. By way of example, sleeve 25 is desirably formed by spraying polyurethane resin uniformly on a mandrel having the form of the sleeve, preferably elliptical at the shoulder end and circular at the wrist end, and of dimensions corresponding to the inside dimensions of fitting 12 and outside diameter of bushing 31. Polyurethane has good mechanical strength and resiliency along with abrasion resistance and resistance to radiation. For added chemical resistance, the polyurethane structure may be oversprayed with "Hypalon", an elastomer made by substituting chlorine and sulphonyl chloride groups into polyethylene.

Figure 5:
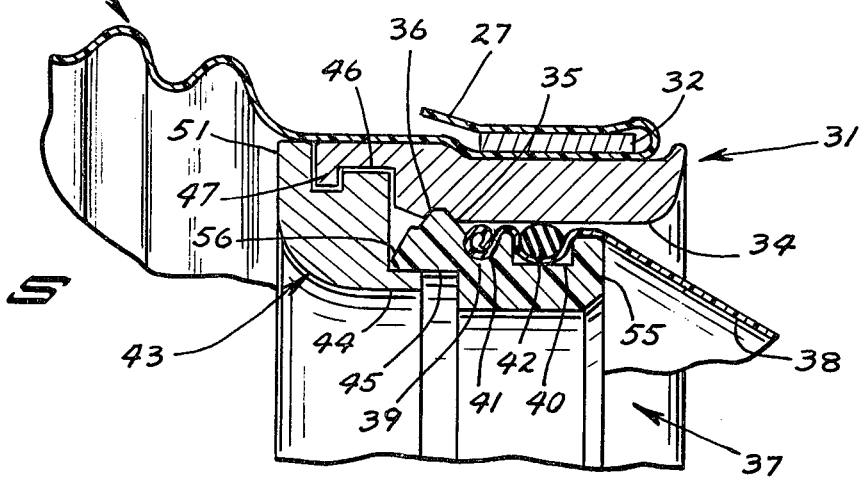
FIG. 5 is a section on the line 5—5 of FIG. 4 and in the direction of the arrows showing a wrist bushing with detachable glove.

As best seen in FIG. 5, the inner surface of bushing 31 which defines a hand hole or passageway is provided with a smooth sealing surface 34 of flat profile. Adjacent to and upstream from the sealing surface, bushing 31 is provided with a continuous groove 35 adapted to receive an annular peripheral bead 36 forming part of an internal sleeve or support ring, indicated generally at 37, which together with a glove 38 is mounted in the bushing. The central opening of support ring 37 provides a passage for insertion of a hand and wrist into the glove. Support ring 37 is formed from a semi-rigid deformable material having good elastic memory properties, such as high-density polyethylene, such that it may be snapped into place with bead 36 engaging groove 35 to immobilize the ring and glove carried by it in the bushing, the outer periphery of bead 36 being of greater diameter than the inner periphery of the bushing.

The outer perimeter of support ring 37 is provided with a first channel or groove 39 adjacent to but downstream from bead 36, and a second groove or channel 40 spaced from the first. Channel 39 performs two functions. It serves to receive the conventional bead 41 of a glove 38 to facilitate initial mounting of the glove on the support ring and to aid in preventing accidental dislodgment of the glove after the sealing device is assembled. As seen by reference to FIG. 6, and explained in greater detail hereinafter, channel 39 also facilitates flexing of bead 36 and slight inward rotation of the bead to facilitate initial placement of the support ring in the bushing and subsequent displacement and replacement.

Channel 40 functions to seat a resilient O-ring 42, which likewise performs two functions. O-ring 42 is formed from resilient rubber or synthetic elastomeric material. Because glove 38 is positioned on support ring 37 prior to O-ring 42, when the O-ring is positioned in the channel it deforms the flexible glove wall into a liner for the channel. The O-ring thus functions to help secure the glove in place on the supporting ring 37. More importantly, however, O-ring 42 performs the primary sealing function of the device by virtue of being compressed into tight sealing engagement with sealing surface 34 of bushing 31 and forcing the inner surface of the glove into tight sealing relation with the bottom of channel 40.

It is apparent that when the supporting ring is mounted in the bushing, the cuff of glove 38 is securely locked against dislodgment from the support ring as a result of any pulling or tugging force exerted on the glove. In order to prevent any accidental dislodgment of the support ring and glove from bushing 31, and consequent disruption of the integrity of the seal of the chamber in which the bushing is located, a rigid bezel or retaining ring, indicated generally at 43, is preferably additionally provided. Retaining ring 43 formed, for example, of aluminum or polyvinyl chloride, or the like, fits into and is secured in the upstream end of bushing 31. The retaining ring has a forwardly projecting lip 44 which extends partially over a shoulder 45 of support ring 37 overlying bead 36. The inside diameter of the support ring at shoulder 45 is somewhat greater than the inside hand hole diameter of the support ring. Lip 44 prevents flexing or rotation of the bead and effectively prevents accidental dislodgment of the bead from bushing groove 35 with consequent possible dislodgment of the support ring and breaking of the seal maintained thereby.

Figure 4:
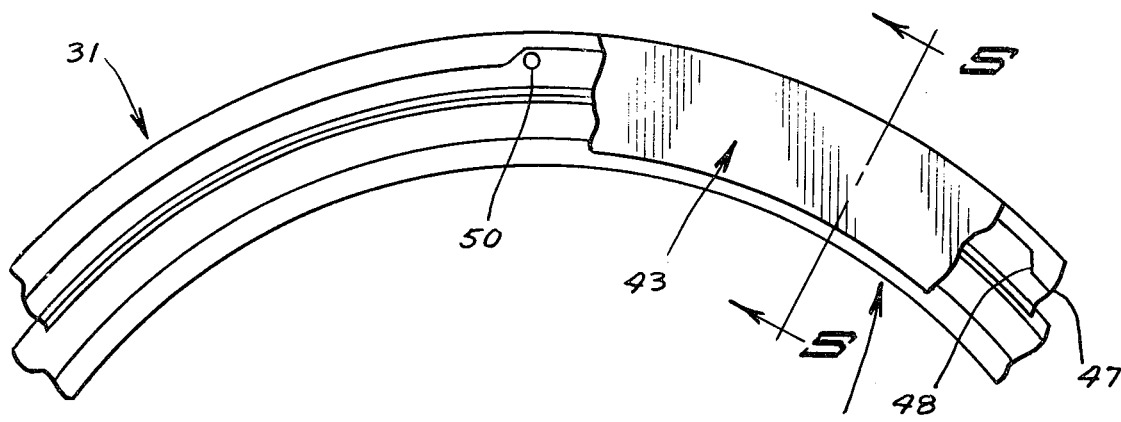
FIG. 4. is a fragmentary front elevation, shown with parts broken away, of the wrist bushing.

In order to secure the retaining ring 43, bushing 37 is provided with an inner peripheral channel 46. A plurality of spaced apart inwardly extending flanges 47 partially overlie channel 46. The open spaces or gaps 48 (FIG. 4) between adjacent sections of flange 47 correspond in number and relative location around the periphery of bushing 31 to a plurality of outwardly projecting tongues or teeth 49 on the perimeter of retaining ring 43. To assemble, the retaining ring is positioned at the upstream end of bushing 31 with tongues or teeth 49 overlying openings 48 between flanges 47. The retaining ring is then pushed forward until tongues 49 seat in channel 46, after which the retaining ring is rotated a fractional turn until the retaining ring is retained by virtue of flanges 47 overlying tongues 49 in a bayonet-type joint. Preferably a stop in the form of pin 50 is provided to positively position the retaining ring in locked position in the bushing.

Retaining ring 43 is also preferably provided with an outwardly extending lip 51 which overlies the outer end of the bushing 31. The inner surface of retaining ring 43 is desirably arcuate and smooth, merging with the outer surfaces of lips 44 and 51 to provide a smooth easy obstruction-free entry into the glove 38, in addition to its safety function. Channel 46 likewise performs a dual function in that, as seen in FIG. 6, a bayonet-type connection can likewise be made with an ejection tool 52 fitted with tongues or teeth 53 in the same type of bayonet joint connection as the retaining ring.

Figure 6:
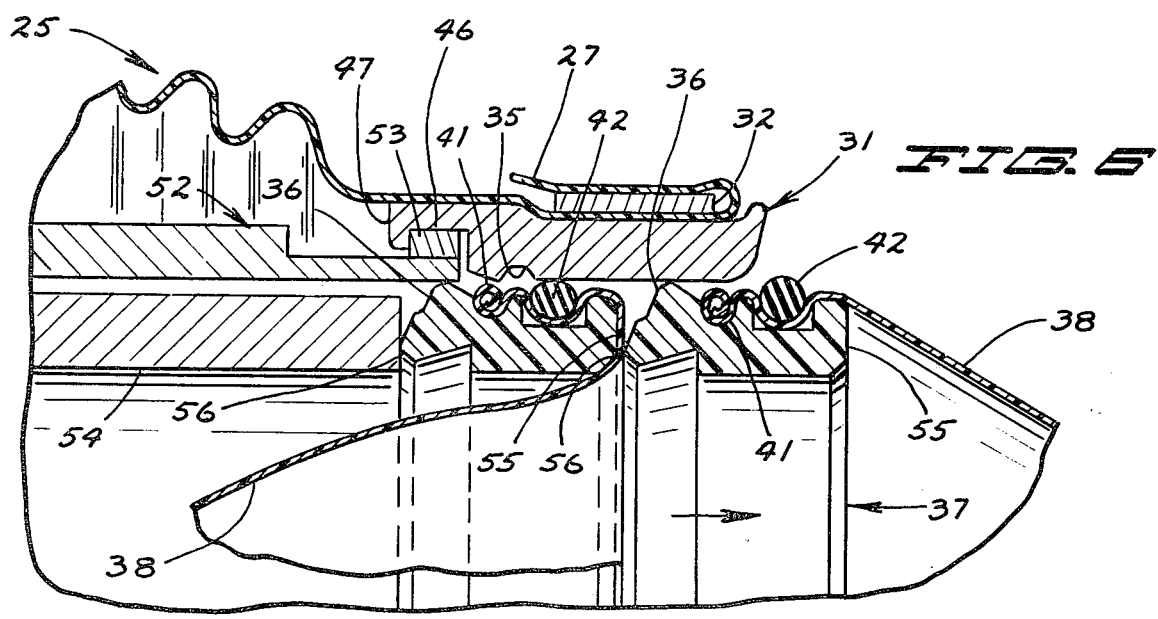
FIG. 6 is a similar sectional view showing the manner in which one glove is displaced and replaced by another.

The manner in which one glove and supporting ring are displaced and replaced by another without breaking the seal is shown by comparison of FIGS. 5 and 6. The retaining ring 43 is first removed from the bushing 31. A second support ring 37 is prepared by mounting a further glove 38 on it with the bead 41 of the glove cuff positioned in groove 39 around the perimeter of the support ring and with O-ring 42 positioned in channel 40. In order to get the glove out of the way during the replacement operation, glove 38 is then partially reversed and pulled through the support ring, as shown in FIG. 6. The newly prepared support ring is then positioned within the jaw of the ejection tool 52 of known type, as described in U.S. Pat. No. 3,267,614, by deforming the support ring slightly by flexing and rotating bead 36 inwardly to reduce the maximum diameter of the support ring to approximately the inside diameter of bushing 31. The ejection tool is then locked into bushing 31 by inserting tongues 52 through the spaces 48 and rotating the tongues in the locking channel 46 of the bushing.

Then, the plunger-like ejection ring 54, which is movable relative to the locked-in frame of the ejection tool, is moved forwardly to push the newly prepared support ring into the bushing. As the forward or inner face 55 of the replacement support ring (now covered by one layer of glove 38) bears against the rearward or outer face 56 of the support ring already in place, the ring is flexed and bead 36 is rotated inwardly and out of groove 35 in the bushing. As this occurs, O-ring 42 of the support ring being displaced maintains the integrity of the seal.

The width of the sealing surface 34 of the bushing is approximately the same as the overall height of support ring 37. Thus, as the replacement support ring is gradually and uniformly pushed forward into the bushing and the original support ring is pushed out, the O-ring 44 of the first ring is pushed far enough into the bushing that the sealing O-ring 42 of the second support ring establishes sealing contact with the bushing. Then, as the replacement support ring is pushed farther, the seal maintained by the O-ring of the first support ring is broken and the displaced support ring falls into the chamber. In the meantime, the immobilizing bead 36 of the replacement support ring snaps into groove 35 in the bushing to hold the new support ring in place. The ejection tool is removed and the retaining ring 43 is replaced. The glove retained by the support ring is pushed through the ring into the chamber and is ready for the resumption of the work to be performed within the chamber.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A system for effecting access for performing work within a sealed enclosure, said system comprising:
   (A) an elongated arm-length impermeable leak-proof flexible sleeve,
   (B) an annular flanged fitting secured in sealing relation in a port in a wall of said enclosure,
     (1) said fitting including an outwardly extending annular lip having at least one continuous groove extending around its outer periphery,
     (2) one end of said sleeve extending through said fitting and folded back aginst the outer periphery of said lip, and (3) a resilient fastening ring securing the sleeve in sealing engagement in said groove,
   (C) a wrist bushing secured in sealing relation to the opposite end of said sleeve,
     (1) said bushing comprising a ring having an outer peripheral groove,
     (2) said sleeve being rigidly clamped in sealing relation in said groove,
     (3) said bushing having a continuous sealing surface extending around its inner periphery and a continuous groove adjacent said sealing surface,
   (D) an annular support ring detachably secured in said wrist bushing,
     (1) said support ring having an outer peripheral deformable semi-rigid bead engaging the inner peripheral groove of said bushing, and
     (2) a continuous channel spaced from the bead and extending around the outer periphery of the support ring, and
   (E) a glove secured in sealing relation on said support ring,
     (1) the cuff of said glove engaging the outer periphery of the support ring, and a resilient fastening ring securing the glove in sealing engagement in said groove, and
     (2) the outer periphery of said resilient ring being in sealing engagement with the sealing surface of said bushing.

2. A system according to claim 1 wherein said sleeve:
   (A) has a cylindrical shoulder portion in engagement with said port fitting and a cylindrical wrist portion in engagement with said wrist bushing, (B) tapers inwardly from said shoulder portion to said wrist portion, and (C) is corrugated throughout the length of said tapered portion.

3. A system according to claim 1 wherein said port fitting is elliptical, the long axis of the ellipse extending horizontally.

4. A system according to claim 1 wherein:
(A) said port fitting has an inner radially extending flange, said flange has a continuous annular groove containing a resilient sealing ring in sealing engagement with the inner wall of said enclosure,
(B) said fitting is maintained in sealing relation by locking ring means engaging the outwardly extending annular lip of said fitting and chamber wall, and
(C) said sleeve is securely clamped to said lip.

5. A system according to claim 1 further characterized in that:
(A) the glove support ring includes a further continuous groove extending around the outer perimeter of the support ring adjacent to said bead in the space between said bead and channel, and
(B) the cuff of said glove is stretched over the outer periphery of the support ring with the bead of said glove being disposed in said further continuous groove.

6. A system according to claim 1 further characterized in that:
(A) retaining ring is detachably secured to the rearward edge of the wrist bushing,
(B) said retaining has a forwardly projecting lip, and
(C) said forwardly projecting lip overlies the inner periphery of the support ring adjacent the rearward edge thereof to positively retain the support ring against deformation.

7. A system according to claim 6 further characterized in that:
(A) the inner periphery of said support ring adjacent the rearward edge thereof is of greater diameter than the remainder of said inner periphery to form a shoulder adjacent said rearward edge, and
(B) said retaining ring lip engages and overlies said shoulder.

8. A system for effecting access for performing work within a sealed enclosure, said system comprising:
(A) an elongated arm-length impermeable leak-proof flexible sleeve,
(B) an elliptical annular fitting secured in sealing relation in a port in a wall of said enclosure,
  (1) the long axis of the ellipse extending horizontally,
  (2) said fitting including an outwardly extending elliptical annular lip having at least one continuous groove extending around its outer periphery,
  (3) one end of said sleeve extending through said fitting and folded back against the outer periphery of said lip,
  (4) a resilient fastening ring securing the sleeve in sealing engagement in said groove,
  (5) clamping means securely clamping said sleeve to said lip,
  (6) said fitting also including an inner radially extending flange, said flange having a continuous annular groove containing a resilient sealing ring in sealing engagement with the inner wall of said enclosure, and
  (7) locking ring means engaging the outwardly extending annular lip of said fitting and outer chamber wall to maintain said fitting in sealing relation with the chamber wall, and
(C) a glove secured in sealing relation to the opposite end of said sleeve.

9. A system according to claim 8 wherein said sleeve:
(A) has an elliptical cylindrical shoulder portion in engagement with said port fitting and a cylindrical wrist portion in engagement with a wrist bushing supporting said glove,
(B) tapers inwardly from said shoulder portion to said wrist portion, and
(C) is corrugated throughout the length of said tapered portion.

* * * * *

UNITED STATES PATENT AND TRADEMARK OFFICE
CERTIFICATE OF CORRECTION

PATENT NO. : 4,141,609
DATED : February 27, 1979
INVENTOR(S) : Gerald A. Eisert

It is certified that error appears in the above-identified patent and that said Letters Patent are hereby corrected as shown below:

Column 7, line 31, after "retaining", --ring-- is omitted.

Signed and Sealed this

Twenty-second Day of May 1979

[SEAL]

Attest:

RUTH C. MASON
Attesting Officer

DONALD W. BANNER
Commissioner of Patents and Trademarks